Aug. 5, 1969  J. W. LUCAS  3,459,475
OVERHEAD PROJECTOR
Filed Nov. 14, 1966  3 Sheets-Sheet 1
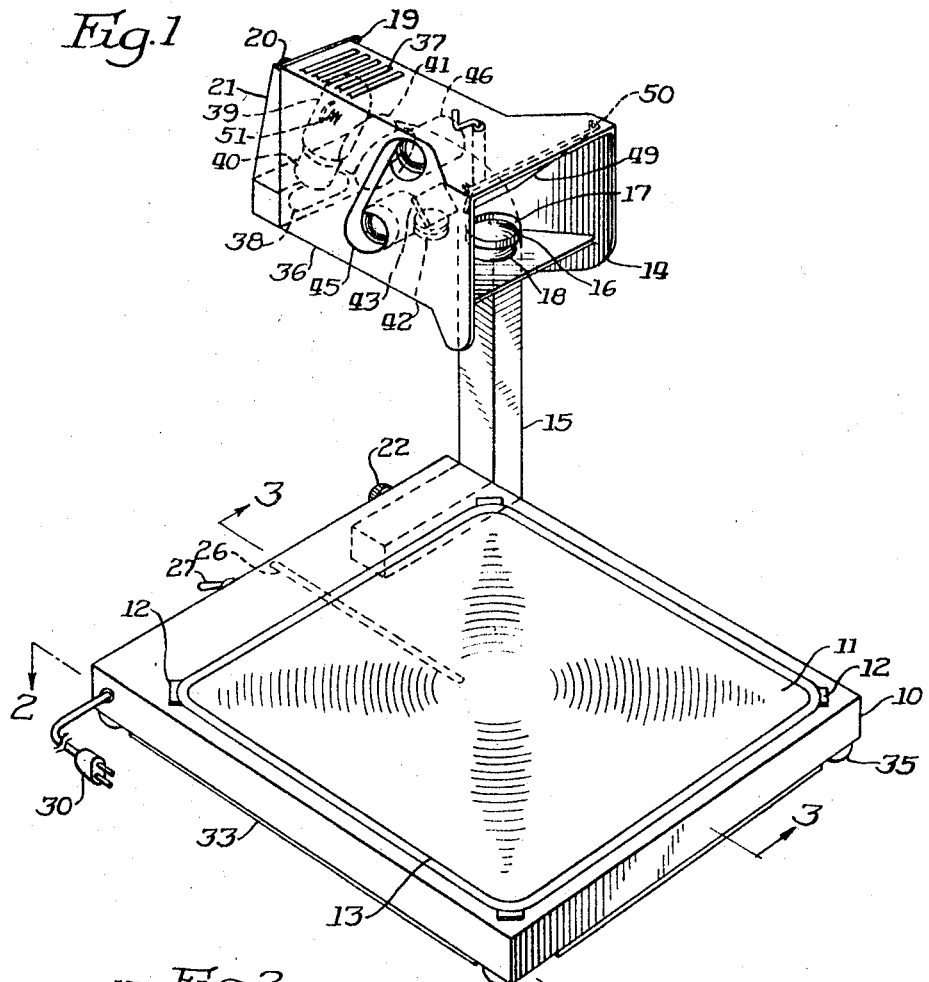
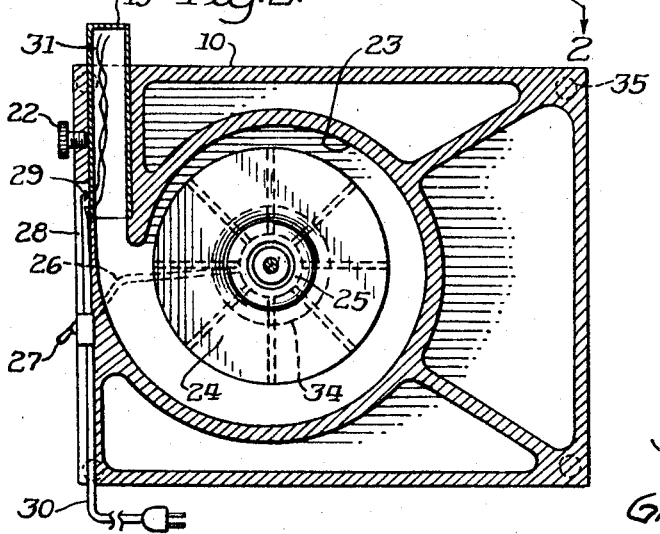
INVENTOR.
James W. Lucas
BY
Griffin and Branigan
Attys Aug. 5, 1969  J. W. LUCAS  3,459,475
OVERHEAD PROJECTOR
Filed Nov. 14, 1966  3 Sheets-Sheet 2
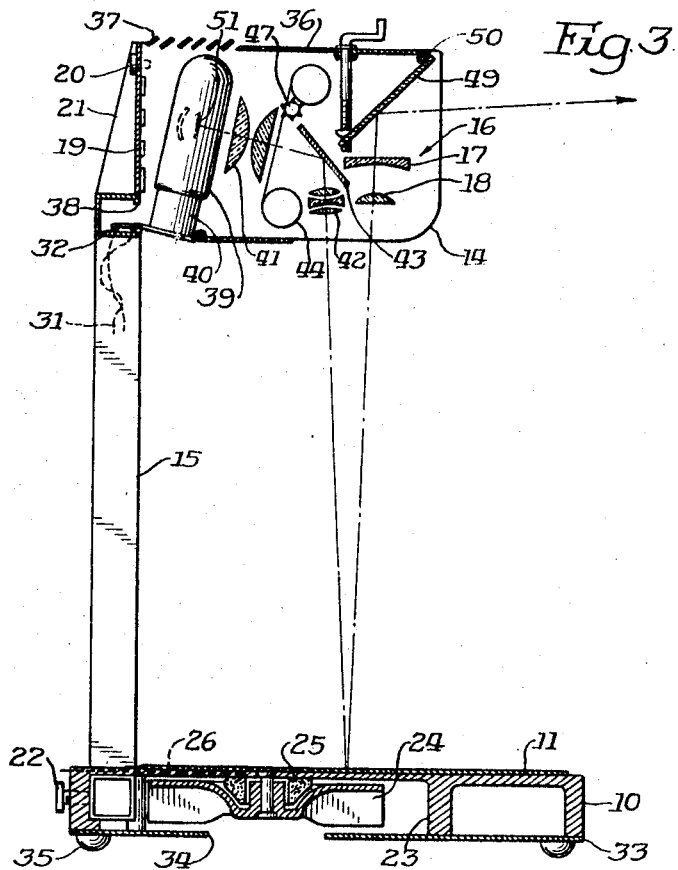
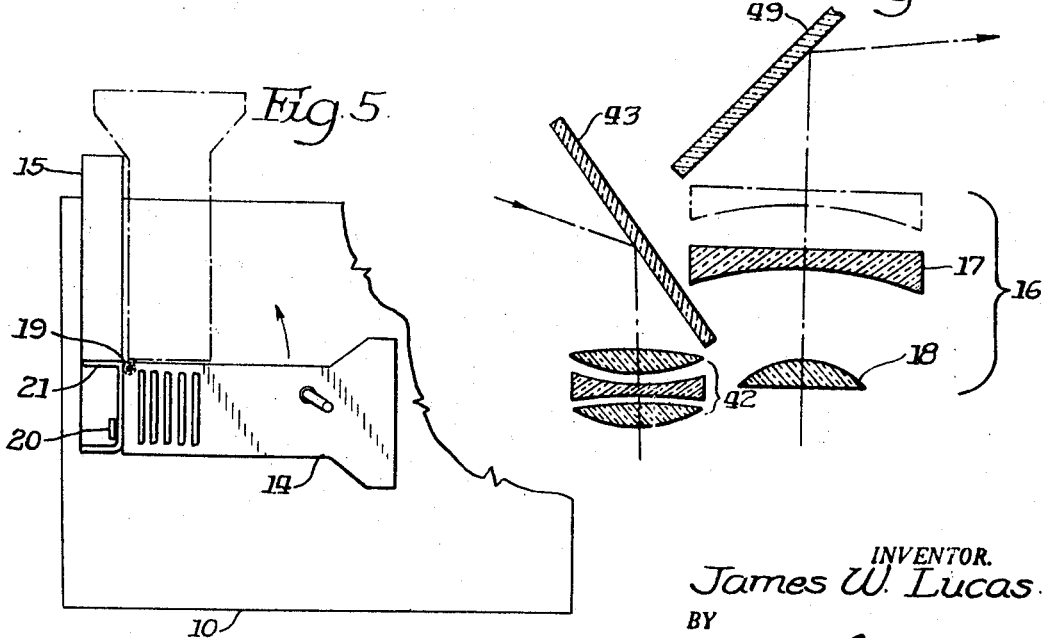
INVENTOR.
James W. Lucas
BY
Griffin and Branigan
Attys

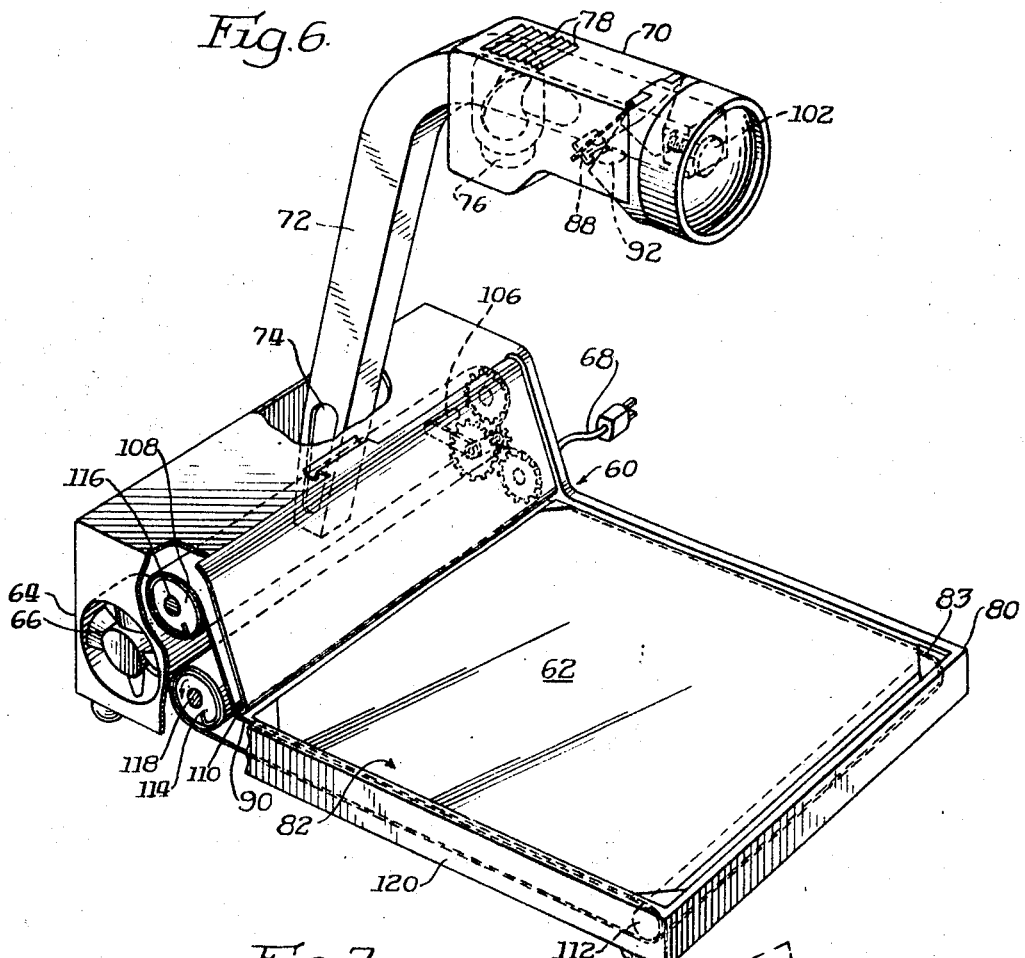
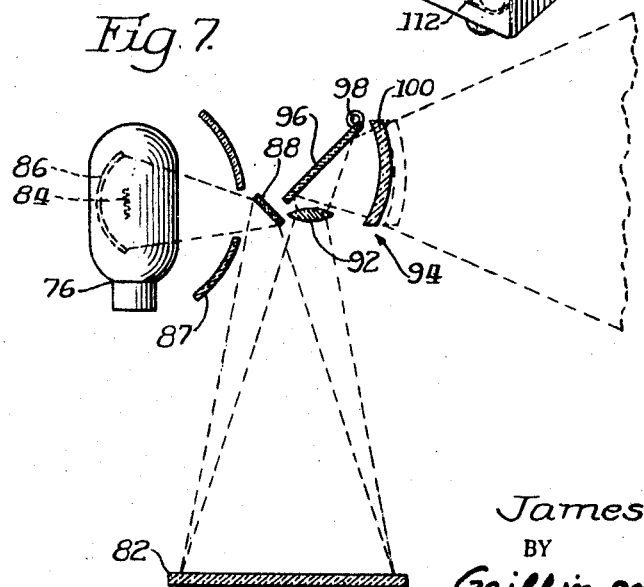

3,459,475
OVERHEAD PROJECTOR
James Wortz Lucas, 1480 N. Doheny Drive,
Los Angeles, Calif. 90069
Filed Nov. 14, 1966, Ser. No. 593,909
Int. Cl. G03b 21/28
U.S. Cl. 353—37                                     15 Claims

ABSTRACT OF THE DISCLOSURE

A method and apparatus for minimizing double images in reflective projectors. The projector has an image transparency located between the light source and a reflective converger so that light emanating from the source, after passing through the transparency, is reflectively converged back through the transparency toward a projection lens which focuses the image from the transparency on a screen. The method of minimizing the double images includes the step of maintaining the reflectively converged light from the reflective converger at its minimum diameter as it enters the projection lens, while at the same time maintaining the light emanating from the source at its minimum diameter as it enters a first projection lens located adjacent the other projection lens and at substantially the same distance from the reflective converger as the minimum diameter portion of the reflectively converged light.

---

This invention relates to overhead projectors and, more particularly, to overhead projectors which use reflection, rather than refraction, at the picture aperture to concentrate a light beam into an upper projection lens. A machine which fits this particular classification is described in my copending application, Ser. No. 548,214 filed on May 6, 1966, now Patent 3,285,126 which issued on Nov. 15, 1966.

The projector of the above referenced copending application is particularly adapted for the reprojection of images from film strips and slides. In the structure described in that application, a plain mirror adjacent to an upper projection head, is effective to redirect a light beam downwardly into a desk level picture aperture. A concave reflector located directly below this aperture reflects the light beam upwardly and concentrates it into the upper projection lens, which focuses the light beam onto a screen in the normal manner. Because the downwardly and upwardly directed beams do not coincide, a double image is formed of any material placed in the picture aperture. That is, it occupies two distinct and different positions relative to the optical centerlines of the downwardly and upwardly directed rays and therefore leads to two images. The projector of that copending application, however, deals primarily with aerial images so that the double-imaging presents only a minor problem.

Where a desk-level overhead projector is primarily concerned with the use of full-size transparencies at the picture aperture, double-imaging presents a major problem. Hence, it is a primary object of this invention to provide a method and apparatus for projecting images from full-size transparencies in a manner so that the tendency towards double images is minimized. In accordance with the principle of the invention, the angle between the downwardly and upwardly directed light beams is maintained relatively small and preferably between about 3 and 15 degrees. This is accomplished by constructing the projection head so that the upwardly directed light ray bundle is at a minimum diameter as it enters the projection lens and the downwardly directed light ray bundle is also at its minimum diameter as it passes the minimum diameter portion of the upward ray bundle.

In order for the projector to accommodate a desired focusing range for various screen distances, it is necessary that at least certain of the projection lens elements be movable. For a conventional projection lens, it is difficult to continuously maintain a minimum separation between the downwardly and upwardly directed light rays when the projection lens is subjected to focusing travel. I have overcome this problem, however, by using a projection lens system somewhat similar to the type described in my U.S. Patent 3,222,981. That is, a two-element lens which corrects for both spherical and chromatic aberrations to an acceptable level. That lens can best be described as a variable focal length projection lens, in which the object distance remains substantially constant. Although this condition can be satisfied by moving either the positive or negative component while the other remains stationary, in the instant case I obtain a minimum angle between the downwardly and upwardly directed light rays by holding the positive element of the above described lens stationary during focusing. In this manner, not only does the projection lens have its smallest element adjacent the minimum diameter light ray bundle issuing from the light source, but this element is not required to be moved during focusing.

As indicated, in accordance with the basic concept of the invention wherein the upward and downward optical centerlines are as close to each other as possible, the bundle of light rays issuing from the light source, should have a minimum diameter at a point adjacent the projection lens. In the preferred embodiments, about to be described, I accomplish this by either using a small diameter light source like the halogen series, which is physically located next to a condensing lens; or, in an alternative embodiment, I use a larger, less expensive, lamp in combination with a condensing system which forms a ray bundle which has a minimum diameter at the point where it passes the projection lens.

Some of the prior art types of overhead projectors have been forced to limit their light output because of a lack of adequate cooling in the projection head. One solution to this problem has been to mount a fan in the projection head. This, however, has defeated one of the main attributes of this type of overhead projector; that is, it has enlarged the projection head size whereby it formed too large an obstruction to viewers located behind the projector; and also made the projection head too large for use as a compact overhead projector that would be suitable for storage in an attache case, for example. Hence, it is a further object of this invention to provide a structure whereby the projection head can be force-cooled without requiring the size of the projection head to be increased. In accordance with this aspect of the invention a blower is located in the projector's base portion and its output is directed through a conduit to the lamp portion of the projection head from which the air is permitted to exhaust through suitable louvers or the like.

Prior art types of overhead projectors have required the use of wide-angle projection lenses in order to realize adequate efficiency from the projection lamp. Because of the short focal lengths which resulted, the projection heads had to be located quite close to the picture aperture and, therefore, interfered with the use of overlays. It is still another object of this invention, therefore, to provide an overhead projector having a projection lens which does not interfere with the use of overlays. This object is accomplished by using the inverted telephoto type of lens described above. That is, because this type of lens has a focal length which is substantially less than the distance from the object to the lens, an increased clearance is provided whereby the projection head provides less interference with overlays.

It is an additional object of this invention to provide an overhead projector which is capable of both reprojecting images from slides or strip film and adding information to the images projected from the slides or strips.

In accordance with another aspect of the invention, therefore, a small additional projection lens is placed in the projection head at the point where the downwardly directed light bundle is at its minimum diameter. A film strip or slide, therefore, which is placed just ahead of the projection head's condensing lens will have an aerial image thereof formed in the plane of the main picture aperture. In this manner, the image from the strip or slide may be optically combined with other information at the main picture aperture such as, for example, where a conveniently movable band of transparent material is located in the main aperture.

In addition to the above described objects, the structure of the invention also has many attendant advantages. For example, in a conventional projector, the portion of the projection lamp directly above the filament is in the optical system and yet is subject to darkening with use. The instant invention does not have this drawback. Additionally, a conventional projector has its condensing element so close to the picture aperture that only a very thin and easily damaged plastic Fresnel lens can be used. The instant structure, on the other hand, is not thusly hampered. Similarly, in a conventional projector, the condensing member cannot be employed near the projection lamp without increasing the projecting lens diameter to a prohibitive size, thereby further compounding the double image problem. Moreover, although Fresnel surface members have been used in previous overhead projectors, they have generally produced a substantial glare which has been quite bothersome to the operator. Because the instant invention eliminates the need for an offset Fresnel axis, however, this undesirable glare is substantially reduced.

The foregoing and other objects, features, and advantages of this invention will be apparent from the following, more particular, description of preferred embodiments thereof as illustrated in the accompanying drawings.

In the drawings:

FIG. 1 is a perspective view of an overhead projector embodying the invention;

FIG. 2 is a plan view of the FIG. 1 projector taken along the lines 2—2 thereof;

FIG. 3 is a sectional view of the FIG. 1 projector taken along the lines 3—3 thereof;

FIG. 4 is a schematic drawing of certain optical elements located in the forward portion of the projection head;

FIG. 5 is a fragmentary plan view of the FIG. 1 projector's reprojection head, with its stowed position shown in phantom;

FIG. 6 is a perspective view of an alternative embodiment of the invention; and, FIG. 7 is a schematic drawing of the FIG. 6 embodiment's optical system.

A first embodiment of the invention will now be described in connection with FIG. 1 wherein a base 10 has a flat upper surface upon which a Fresnel lens 11 is mounted. The ridges of lens 11 are faced downwardly and the entire lower surface of the lens is silvered. Lens 11 has a flat upper surface and is held on to base 10 by corner clips 12. Picture aperture 13 may be formed by any suitable means, such as by painting a border around lens 11.

The projection head assembly 14 encloses all of the optical elements except lens 11 and is supported above picture aperture 13 by a rectangular tube or conduit 15 which attaches to base 10. Head assembly 14 remains stationary while the screen, having a normal variation of screen distances between 4 and 22 feet, is focused upon by a two element projection lens 16. Only negative element 17 is moved approximately ½-inch to accommodate this focal range, as will be described in more detail shortly. Positive element 18 remains stationary at all times.

For stowage within a standard attache case, or the like, head assembly 14 is pivoted horizontally 99° about hinge 19, by disconnecting screw 20 in bracket 21 from the back of head assembly 14. Screw 22 in base 10 is loosened to permit withdrawal of tube 15 from base 10, and the flat head and tube assembly thus formed may then be stowed parallel to base 10 within a suitable case. Pivoting head assembly 14 about hinge 19 also allows access to the thusly opened back for replacement of the projection lamp directly inside.

As shown in FIG. 2, involute chamber 23 for centrifugal blower wheel 24 is formed within the lower portion of base 10 under picture aperture 13. Electric motor 25 is nested within the hub portion of wheel 24 and is attached to base 10. Electric wires 26 are located in a groove under lens 11 and connect motor 25 to three-way switch 27 at the back of base 10. Wires 28 also run from switch 27 through base 10 to the mounting hole for tube 15 and terminate in contact points 29. Main power cord 30 enters base 10 from the opposite side. Three-way switch 27 allows blower motor 25 to remain connected to power cord 30 for a cooling period after the projection lamp connected through wires 28 has been turned off. Tube 15 is hollow and provides passage for cooling air from blower chamber 23 to projection head 14. Electrical wires 31 also run inside tube 15 and connect to contacts 32 of the projection lamp, which becomes electrically connected to contacts 29 upon insertion of tube 15 into base 10. Flat plate 33 contains blower inlet hole 34 and mounts on the bottom of base 10. Feet 35 hold base 10 a short distance above the desk to allow cooling air to be drawn into the blower through hole 34.

Most of the details of this particular embodiment of the projection head 14 are best shown in FIG. 3. Therein, outer case 36 mounts the stationary optical parts and has louvres 37 in its top to exhaust cooling air from the blower in base 10. Support or conduit tube 15 has its upper end closed, and cooling air enters case 36 through port 38 in the front of tube 15. Projection lamp 39 mounts in socket 40 and is shown to contain an integral reflector. Other types can be used, but this type is shown for simplicity. Light rays issuing from filament 51 of lamp 39 are concentrated by condensing lenses 41 into a filmstrip projection lens 42, after being directed downwardly by fixed mirror 43. Filmstrip holder 44 may be inserted into slot 45 if aerial images are desired in the plane of picture aperture 13. Film 46 is advanced by any suitable means such as sprocket 47.

As best seen in FIG. 4, an image of filament 51 is formed within projection lens 42 by condensing lenses 41. This filament image is again formed within positive element 18 of projection lens 16 by Fresnel lens 11 mounted on base 10. These two images of lamp filament 51 are substantially identical in size and adjacent each other.

The upwardly directed light beam passes through projection lens 16 and is reflected by movable mirror 49 into a substantially horizontal direction, for projection to a viewing screen. Movable mirror 49 pivots about hinge 50 to elevate the screen image.

As shown in FIG. 5, the forward section of projection head assembly 14 must only be wide enough to accommodate the width of the top of mirror 49. The remainder of assembly 14 can be substantially narrower, so that stowage within a standard size attaché case, or the like, can be accomplished. For this purpose, the entire head is rotated horizontally about vertical hinge 19, and the wide forward section overlaps support tube 15 to minimize the total width.

It should be appreciated that the above described structure's downwardly and upwardly directed light rays are at their minimum diameters when they are adjacent each other in lens element 18 and 42, respectively. In this manner, and in accordance with the method of the invention, the angle between the center lines of the two light ray bundles is maintained at a practical minimum. Hence, the double-imaging problem is also minimized. Moreover, because only the projection lens' negative element 17 must be moved while the screen is focused upon, this minimization is maintained across the entire focusing travel of the projection lens.

In addition, because the projection head structure is kept very small it is readily portable and does not substantially block the line of sight of a viewer that might be located on the opposite side of the projector from the screen. Still further, because of the forced air cooling of the projection head, the lamp can be used most efficiently, to the point where the prior art's wide angle lenses are not required. Hence, the projection head can be maintained at a height which is sufficient so as not to interfere with the use of overlays. And finally, the above described projector has both a reprojection capability and, because it does not require an offset Fresnel axis, has less of the objectionable glare that is characteristic of prior art Fresnel surfaced projectors.

With respect to the inventive structure's reprojection capabilities, it should also be noted that the double image minimization is accomplished whether the invention structure's reprojection aspects are utilized or not. This, however, will be further emphasized in connection with an alternative embodiment of the invention which will be described shortly in connection with FIGS. 6 and 7.

As indicated above, in a broad sense the method of the invention resides in placing the minimum ray bundles of both the downward and upward light rays at their plane of adjacency where the upwardly directed beam passes through the smaller stationary element of the inverted telephoto projection lens. In this respect, therefore, although a specific example of a suitable lens structure will now be set forth, it should be realized that it is merely exemplary and that the invention is not limited thereto.

Optical calculations involved in an embodiment of my novel projection system may be accomplished as follows:

Since clearance for the use of overlays is desired, the projection lens assembly 16 should be approximately 14 inches above large picture aperture 13. Where a two-element lens system of the type described in my United States Patent 3,222,981 is used, the fixed element is placed at the point where the image of projection lamp filament 51 is formed. It is in this manner that the separation of incident and reflected optical centerlines is minimized. In order to allow the screen image to be large at relatively short throw distances, the positive lens element 18 is chosen as the fixed element and is positioned nearest the picture aperture at a 14-inch distance above it. A variation of ½-inch in the separation between elements is chosen to vary the screen distance from 4 feet to 22 feet. A maximum separation of ¾-inch allows negative lens element 17 to be of minimum diameter.

Page 81 of F. W. Sears' Optics, Addison-Wesley Press, Inc., 1946 edition, states that the reciprocal of the focal length F of a lens equals the sum of the reciprocals of the conjugate distances S (object distance) and $S^1$ (image distance), so $$\frac{1}{F} = \frac{1}{S} + \frac{1}{S^1}$$

Equating the limiting conditions for focus:

$$\frac{1}{f_p} = \frac{1}{14''} + \frac{1}{S_p^1}$$

where subscript $p$ applies to the positive element.

$$\frac{1}{f_n} = \frac{1}{264''} - \frac{1}{S_p^1 - .25''} = \frac{1}{48''} - \frac{1}{S_p^1 - .75''}$$

where $n$ means the negative element.

then $S_p^1 = 5.92''$ and $$\frac{1}{f_p} = \frac{1}{14} + \frac{1}{5.92}; f_p = +4.16''$$

$$\frac{1}{f_n} = \frac{1}{48} - \frac{1}{5.92 - .75}; f_n = -5.80''$$

To obtain color correction, as noted in United States Patent 3,222,981, an average separation of lens elements of .50" is used and applied to the formula found on page 501 of Mirrors, Prisms and Lenses, by J. P. C. Southall, MacMillan Company, 1954 edition. That is:

$$C = \frac{V_1 f_1 + V_2 f_2}{V_1 + V_2}$$

where C is the separation, and $V_1$ and $V_2$ are the Abbe dispersion numbers.

Selecting dense flint glass for the negative element, we find that a readily available type has a refractive index of 1.649 and an Abbe number of 33.9. Hence:

$$.50 = \frac{4.16\ V_1 - 5.80\ (33.9)}{V_1 + 33.9}$$

and $$V_1 = 58.5$$

A normal crown glass with Abbe number 58.5 is also readily available and has a refractive index of 1.523. This material seems reasonable for the positive element.

Page 91 of Sears gives the focal length of two lens elements separated by a distance $t$ as:

$$\frac{1}{f} = \frac{1}{f_1} + \frac{1}{f_2} - \frac{t}{f_1 f_2}$$

(far) $\frac{1}{f} = \frac{1}{4.6} - \frac{1}{5.80} + \frac{.25}{4.16\ (5.80)} = \frac{1}{12.90}$ (near) $\frac{1}{f} = \frac{1}{4.16} - \frac{1}{5.80} + \frac{.75}{4.16\ (5.80)} = \frac{1}{10.07}$ The equivalent focal length of the combination is thus seen to vary from 10.07" when focused for a screen distance of 4 feet, to 12.90" when focused at 22 feet.

In these respects, it should be appreciated that in accordance with the formulas at page 81 of Sears, a normal projection lens of 10" focal length would have to be located with in 10.40" of the large picture aperture 13. This location, however, would prevent the use of overlays because a hinged trransparency is approximately 12" wide and, therefore, would not be able to swing under the projection lens.

The other primary correction required in a lens is that for spherical aberration, or tendency of paraxial and marginal rays to focus at different points along the optical axis. For a rough approximation of the "bending" of each element to accomplish this correction, a calculation procedure is used as outlined in Applied Optics and Optical Design, by A. E. Conrady, Dover Publications, Incorporated, 1957 edition, pages 96–100.

The negative elements (17 in FIG. 4) is spaced ½-inch from the positive element for an average correction. At which time, an 84-inch screen distance results. A virtual image is then formed by the negative element alone at 5.42".

The total curvature $c$ of each lens element is calculated from the following formula found on page 94 of Conrady:

$$1/l^1 = (N-1)C + 1/l$$

where $l$ and $l^1$ are the conjugate object and image distances, and N is the refractive index, whereby $C_n = -.2660$ for the negative element.

The "G sum" elements used in Formula 30 in Conrady for longitudinal aberration ($LA_{p'}$), have values dependent only on the refractive index. These values are listed on page 513 of Condray. If $y$ is the semi-aperture of the lens, and $C_3$ is the curvature of the surface nearest the positive element; then:

$$LA_{p'} = y^2 l'^2 (G_1 C^3 - G_2 C^2 C_3 + G_3 C^2/l + G_4 CC_3^2 - G_5 CC_3^2/l + G_6 C/l^2)$$

Differentiating the result to a minimum, we obtain:

$C_3 = -.241$; $r_3 = 1/C_3 = -4.15''$; and $LA_{p'} = -.0254$

Then because $$C = \frac{1}{r_3} - \frac{1}{r_4}$$

it follows that $r_4 = +40.00''$.

As noted above, the positive element is fixed at a distance of 14 inches from the picture aperture, and forms a real image of this object at 5.92 inches. Hence, $$C_p = +.4600$$

Consequently, using $LA_{p'} = -.0254$, $C_1$ is calculated to be $+.0267$, and the first surface of the positive element then has a radius of $1/C_1$ which is $+37.40$ inches. In addition, because $$C = \frac{1}{r_1} - \frac{1}{r_2}$$

$r_2 = -2.31''$.

The remaining four Seidel aberrations concern extra-axial image points and are found in a highly complex manner such as that described in chapter 6 of Conrady. These abberations are coma, astigmatism, Petzval curvature of field and distortion. Because they are not required for an understanding of the invention, however, they will not be treated here.

Fresnel lens 11 acts as a light gathering element by forming an image of projection lens 42 in positive lens element 18. The lamp filament 51 is already imaged within lens 42, and all light rays issuing from lens 42 are therefore concentrated into lens element 18 by Fresnel lens 11. Since lens 11 in the preferred embodiment is silvered on the lower surface, it will be treated as a "thick mirror" and designed in accordance with the following:

Because it is desirable that both conjugates of a reflective light gathering system be equal, the conjugates are both 14 inches, so the focal length will be approximately 7 inches, since $$\frac{1}{f} = \frac{1}{S} + \frac{1}{S'}$$

as noted previously. For a picture aperture 13 of about 10 x 10 inches, half the diagonal is approximately 7 inches. .70 of the maximum radius is selected as the locus of points where the theoretical spherical reflecting surface intersects the planar upper surface of Fresnel lens 11. Since this lens is then effectively plano-convex, its main function is to lengthen the conjugates of the spherical reflecting surface. Polystyrene is chosen as a satisfactory material, with a refractive index of 1.59. The conjugates of the reflector are then calculated from the angle at the selected 5 inch radius. From page 72 of Southall:

$$\sin \phi = \sin \phi'/n = \sin 19° 38'/1.59 = 12° 14'$$

where $\phi$ is the angle of incidence upon the first surface of lens 11 at the five inch radius; and $\phi$ is the angle the refracted light ray makes with the Fresnel's first surface.

Then $S = S' = 14 (\tan 19° 38'/\tan 12° 14') = 23.0''$

The radius of curvature of the lower spherical surface of lens 11 is equal to the conjugates, or $23''$ R. From page 228 of Southall:

$$1/f = [(n' - n/n)][1/r_1 - 1r_2] = .59 (0 + 1/23)$$

whereby $f$ lens $11 = 39''$. Hence, because $$\frac{1}{f_{total}} = \frac{2}{f_{lens}} + \frac{2}{r_{refl.}} = \frac{2}{39} + \frac{2}{23}$$

$f_t = 7.23''$ (of "thick mirror").

From the foregoing calculations it will be seen that a styrene Fresnel lens of $39''$ focal length can be silvered on the stepped surface and mounted with the flat surface upward.

In order for a one-inch wide image on film 46 to fill the 10-inch width of picture aperture 13, filmstrip projection lens 42 must be 1.40 inches from the film. The focal length of lens 42 is then found from Sears as:

$$\frac{1}{F} = \frac{1}{S} + \frac{1}{S'} = \frac{1}{1.40} + \frac{1}{14.0}$$

$F = 1.27$ inches whereby the projection lens 42 is assigned a relative aperture of 1.6 so that lamp filament 51, chosen as approximately .31 inch square for a 500-watt lamp, can have a doubled image size within the lens. Condensing lenses 41 must then be placed approximately 1.25 inches from projection lamp filament 51 and 2.50 inches from the center of lens 42. Lenses 41 must be approximately 1.40 diameter, so that the cone of issuing light rays encompasses the .75 x 1.00 inch image on film 46. If lenses 41 are identical, from Sears we find that:

$$\frac{2}{f} = \frac{1}{1.25} + \frac{1}{2.50}$$

whereby $f = 1.67''$ (each lens)

Projection lens 42 would seem to require a large relative aperture for what might be termed a fairly wide-angle projection lens. However, the design of such a lens is made far simpler than is normally the case, since it requires no focussing range whatever, and the light rays carrying the picture information always travel through precisely the same areas of the lens.

Having described a first embodiment of the invention, a second embodiment thereof will now be described in connection with FIGS. 6 and 7. In this embodiment the reprojection feature has not been included. The basic concept, however, has been maintained. That is, the minimization of double imaging by placing the minimum ray diameters of both the downwardly and upwardly directed light rays at their plane of adjacency when the upward ray is in the smaller element of the projection lens has been maintained.

Additionally, this embodiment of the invention includes a band of transparent material which is adapted to be moved across the picture aperture in either direction. Moreover, because the area directly below the picture aperture is opaque, the band of transparent material can reverse its direction underneath the concave reflector, permitting the use of closely adjacent take-up spools and a single control element for the transparent band's motion in either direction. This concept is quite similar to that described in my copending application, now issued as United States Patent 3,285,126.

In FIG. 6 a main body 60 has a projection stage portion 62 and a blower housing portion 64. A blower 66 is housed within the blower portion 64 and driven by a motor (not shown) through electrical power received from an electrical cord 68.

A projection head assembly 70 remains stationary above the projection stage portion 62 by means of a rectangularly cross-sectioned support or conduit tube 72. Cooling air from the blower 66 is directed upwardly through the support tube 72. This is accomplished by means of any suitable ducting from the blower 66 to an entry 74 in the support tube. The cooling air is directed into the projection head 70 to cool a projection lamp 76 in a manner similar to that described in connection with the invention's first embodiment. Also similarly, this cooling air exits from the projection head 70 through louvers 78. The support tube 72 also contains wires connected to electrical cord 68 for delivering power to the projection lamp 76. This embodiment's support tube is also detachable from the projector's main body portion 60 in a manner similar to that described in connection with the FIG. 1 embodiment. Hence, his structure will not be further described.

Also, as in the first embodiment, the projection stage portion 62 is comprised of a base 80 having a flat upper surface to which is mounted a Fresnel lens element 82. The ridges of the lens 82 are faced downwardly and the entire lower surface of the lens is silvered. Lens 82 has a flat upper surface and is held onto the base 10 by any suitable means such as clips 83.

As shown more fully in FIG. 7, the projection head is comprised of the projection lamp 76 which has a suitable filament 84 and an integral elliptical reflector 86. The lamp is illustrated as having a spherical reflector 87 to improve the efficiency of the system. The light ray bundle from the projection lamp 76 is directed towards a fixed dichroic mirror 88 which is located both at the point where the ray bundle from the lamp 76 is at its minimum diameter and opposite a fixed element 92 of a projection lens 94 which will be described shortly. The ray bundle is then directed downwardly by the mirror 88 through a transparency 90 (FIG. 6) and onto the Fresnel lens 82 which gathers and convergently reflects the light upwardly back through the transparency towards the fixed positive lens element 92 of the projection lens 94.

It should be carefully noted that the upwardly directed light beam has its minimum ray bundle in the fixed positive element 92 of the projection lens which is located adjacent the fixed dichroic mirror 88 at which point the downwardly directed ray bundle was at a minimum. Hence, the angle between the two optical center lines is maintained at a minimum whereby double imaging is minimized. Moreover, in this manner the projection head may be kept quite small so that the projector's convenient portability is maintained; and the glare from the Fresnel surface is also held to a minimum.

After passing through the fixed positive element 92, the light ray bundle is directed upwardly to a mirror 96 which is adjustably mounted within the projection head assembly 70 by means of a pivot pin 98 or the like. After leaving the mirror 96 the light ray bundle passes through a negative lens element 100 which is adapted to be moved back and forth by an adjusting means such as a thumb screw 102 (FIG. 6). Again, the projection lens elements are made in accordance with the teachings of my United States Patent 3,222,981. In these respects, the design details of this second embodiment's lenses and other optical elements will not be discussed again at this time because it will be apparent to those skilled in the art that calculations similar to those discussed in connection with the invention's first embodiment can be employed.

The transparency material 90 is controlled by means of a take-up crank 106 in FIG. 6. Because the take-up crank and its related structure are more fully described in my United States Patent 3,285,126, I will describe them only briefly at this time. In this respect, the transparent material 90 is looped from a take-up spool 108 under a surface 110 of the projector's blower housing portion 64, and over the Fresnel lens 82. After passing over the Fresnel lens, the transparency is doubled back over a roller 112; under projection stage 62 and onto a take-up spool 114.

The crank 106 is suitably arranged and geared so that motion of the crank is one direction transfers the transparency material from spool 108 to spool 114, while motion of the crank in the other direction transfers the material from spool 114 to spool 108. Although not shown in detail, it will be appreciated that the two spools may be suitably removable such as by sliding them off spindles 116 and 118. Similarly, the transparency may be made removable from about the roller 112 such as by providing a suitably removable side 120 of projection stage portion 62.

Having described two embodiments of the invention's structure it will be appreciated that the method of the invention is suitable for use with either of the embodiments. Similarly, it will be appreciated that both embodiments provide a structure whereby the double imaging problem is substantially solved, at least to the point where double images are minimized. Moreover, although the projection head is adapted for detachment and portability, it is nevertheless forced-air-cooled, whereby the projector realizes a greater degree of efficiency. In addition, both structures lend themselves toward the design of very small projection heads having short focal length lenses which nevertheless permit a sufficiently large image conjugate distance so as not to interfere with the use of overlays. Still further, although only the first embodiment was thusly described, both structures are suited for a reprojection capability. That is, the second embodiment is easily adapted for reprojection merely by placing a reprojection lens opposite the fixed projection lens element 92 and incorporating an adequate condenser and slide stage between the lamp 76 and the thusly inserted reprojection lens. Moreover, if it is desired to add information to the reprojected material it can not only be placed thereon by means of the additional information's being added to the transparency 90, but the added information can even be prerecorded and added as desired by proper manipulation of the take-up crank 106.

While the invention has been particularly shown and described with reference to preferred embodiments thereof, it will be understood by those skilled in the art that various changes in form and detail may be made therein without departing from the spirit and scope of the invention. For example, although the invention has been described in connection with a portable projector, this has merely been because the invention has particular utility in that respect. The principles of the invention could equally as well be practiced in connection with a projector whose projection head is not detachable and thereby probably too cumbersome to be referred to as being portable." Consequently, the invention is only limited in scope as may be indicated by the extent of the claims.

The embodiments of the invention in which an exclusive property or privilege is claimed are defined as follows:

1. An overhead projector of the type in which radiant energy from a radiant energy source is directed through a first lens toward a support member located between said first lens and a reflective converging means so that radiant energy from said source, after passing through a substantially transparent information bearing material placed on said support member, is reflectively converged back through said information bearing material toward a projection lens for focusing images of the information on said information bearing material onto a viewing surface; the method of minimizing double imaging of said information comprising the steps of:

maintaining the reflectively converged radiant energy from said reflective converging means at its minimum diameter as it enters said projection lens; and maintaining the radiant energy emanating from said source at its minimum diameter as it enters said first lens located adjacent said projection lens and at substantially the same distance from said support member as the minimum diameter portion of said reflectively converged radiant energy.

2. The method of claim 1 wherein said first lens is a projection lens and includes the step of:

passing the radiant energy from said source through a first information bearing member before said radiant energy from said source reaches its minimum diameter.

3. The method of claim 2 including the steps of focusing an image of the information on said first information bearing member at said support member; and adding additional information at said support member so that an image of said information on said first information bearing member is combined on said viewing surface with an image of said additional information.

4. In an overhead projector of the type in which radiant energy from a radiant energy source is directed toward a support member located between said radiant energy source and a reflective converging means so that radiant energy from said source, after passing through a substantially transparent information bearing material placed on said support member, is reflectively converged back through said information bearing material toward a projection lens for focusing images of the information on said information bearing material onto a viewing surface; the improvement comprising:

a first lens element of said projection lens having a fixed position between said support member and said viewing surface, and located so that the reflectively converged radiant energy from said reflective converging means is at a minimum diameter in said first lens element;

a second lens element of said projection lens located between said first lens element and said viewing surface, said second lens element being adjustable to varying distances from said first lens element for focusing an image upon said viewing surface; and, means for converging the radiant energy from said radiant energy source to a minimum diameter as it passes said first lens element as said radiant energy from said source travels toward said support member.

5. Apparatus according to claim 4 wherein said first lens element is positive.

6. Apparatus according to claim 5 wherein said second element is a negative lens.

7. Apparatus according to claim 4 including means for inserting an information bearing element between said radiant energy source and the minimum diameter portion of the radiant energy from said source; and, a second projection lens located at the minimum diameter portion of said radiant energy from said source for projecting an image of the information from said information bearing element toward said support member.

8. Apparatus according to claim 4 including a base for housing said support member and said reflective converging means and wherein said radiant energy source is located in a housing above said base; and further including:

a conduit extending from the base to the housing;

and a blower for directing cooling air into said conduit so that the housing for said radiant energy source is cooled without substantially increasing its size.

9. Apparatus according to claim 8 wherein the housing for said radiant energy source is supported above said support member by said conduit.

10. Apparatus according to claim 9 wherein said conduit is detachable from said base.

11. Apparatus according to claim 8 wherein said blower is of the involute type and located below said support member.

12. Apparatus according to claim 4 including a relatively thin, flat base member for housing the support member and the reflective converging means;

a transparency receptacle for holding a band of flexible transparent material;

and means for selectively moving said transparent material in either direction across said support member.

13. Apparatus according to claim 12 wherein said radiant energy source is located in a housing above said flat base member; and further including:

a conduit extending from the transparency receptacle to the housing;

and a blower for directing cooling air into said conduit so that the housing for said radiant source is cooled without substantially increasing its size.

14. Apparatus according to claim 13 wherein the housing for said radiant energy source is supported above said support member by said conduit.

15. Apparatus according to claim 14 wherein said conduit is detachable from said transparency receptacle.

References Cited

UNITED STATES PATENTS

| 3,207,029 | 9/1965 | Field et al. | 88—24 |
| 3,293,982 | 12/1966 | Appeldorn | 88—24 |
| 3,340,765 | 9/1967 | Herriott | 88—26 |

NORTON ANSHER, Primary Examiner

RICHARD M. SHEER, Assistant Examiner

U.S. Cl. X.R.

353—38

UNITED STATES PATENT OFFICE
CERTIFICATE OF CORRECTION

Patent No. 3,459,475      Dated August 5, 1969

Inventor(s) JAMES W. LUCAS

It is certified that error appears in the above-identified patent and that said Letters Patent are hereby corrected as shown below:

Column 4, line 6, "99°" should read -- 90° --.
Column 5, lines 43 and 53, "14" should not be heavy type.
Column 6, the formula beginning at line 35, the portion reading:

$$\frac{1}{4.6} \quad \text{should read} \quad \frac{1}{4.16}$$

Column 6, line 59, "elements" should read -- element --; line 75 "Condray" should read -- Conrady --. Column 7, line 59, the portion of the formula reading:

$$1.59 = 12°14' \quad \text{should read} \quad 1.59; \ 12°14'$$

Column 7, line 61, "$\phi$" should read -- $\phi'$ --;
The formula at line 69, that portion of the formula reading:

$$[(n'-n/n)][1/r_1-1/r_2] \quad \text{should read} \quad [(n'-n)/n](1/r_1-1/r_2)$$

Column 9, line 3, "his" should read -- this --.
Column 10, line 37, 'portable."' should read -- "portable." --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents